(12) United States Patent
Simpson et al.

(10) Patent No.: US 9,207,688 B2
(45) Date of Patent: Dec. 8, 2015

(54) AIRCRAFT BLEED SYSTEM AND METHOD OF CONTROLLING AN AIRCRAFT BLEED SYSTEM

(71) Applicants: Scott W. Simpson, Easthampton, MA (US); John M. Dehais, Windsor, CT (US); Donald E. Army, Enfield, CT (US)

(72) Inventors: Scott W. Simpson, Easthampton, MA (US); John M. Dehais, Windsor, CT (US); Donald E. Army, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 396 days.

(21) Appl. No.: 13/654,959

(22) Filed: Oct. 18, 2012

(65) Prior Publication Data

US 2014/0109978 A1    Apr. 24, 2014

(51) Int. Cl.
*F15B 13/04* (2006.01)
*G05D 16/20* (2006.01)
*B64D 13/00* (2006.01)
*B64D 13/02* (2006.01)
*B64D 13/06* (2006.01)

(52) U.S. Cl.
CPC .............. *G05D 16/20* (2013.01); *B64D 13/00* (2013.01); *B64D 13/02* (2013.01); *B64D 2013/0618* (2013.01); *Y02T 50/56* (2013.01); *Y10T 137/0379* (2015.04); *Y10T 137/8593* (2015.04)

(58) Field of Classification Search
CPC ........ G05D 16/20; B64D 13/02; B64D 13/00; B64D 213/0618; Y02T 50/56; Y10T 137/0379; Y10T 137/8593

USPC ................. 137/625.4, 625.25, 625, 6, 625.64
See application file for complete search history.

(56) References Cited

U.S. PATENT DOCUMENTS

| | | | | |
|---|---|---|---|---|
| 4,671,318 A | * | 6/1987 | Benson | 137/486 |
| 4,765,131 A | * | 8/1988 | Benson | 60/782 |
| 4,779,644 A | * | 10/1988 | Benson | 137/606 |
| 8,047,903 B1 | * | 11/2011 | Schiff | 454/71 |
| 8,800,594 B2 | * | 8/2014 | Futa et al. | 137/492.5 |
| 2004/0177639 A1 | * | 9/2004 | Army, Jr. et al. | 62/402 |
| 2004/0194493 A1 | * | 10/2004 | Army, Jr. et al. | 62/402 |
| 2010/0092116 A1 | * | 4/2010 | Franconi | 384/317 |
| 2011/0259546 A1 | * | 10/2011 | Defrancesco et al. | 165/42 |
| 2012/0180886 A1 | * | 7/2012 | Army et al. | 137/596.14 |
| 2012/0285184 A1 | * | 11/2012 | Voinov | 62/87 |

* cited by examiner

*Primary Examiner* — Jessica Cahill
(74) *Attorney, Agent, or Firm* — Cantor Colburn LLP

(57) ABSTRACT

An aircraft bleed system includes a low pressure supply port for delivering a first fluid at a first pressure. Also included is a high pressure supply port for delivering a second fluid at a second pressure, the second pressure greater than the first pressure. Further included is a feedback circuit in operable communication with the high pressure supply port for receiving the second fluid. The feedback circuit includes a first branch configured to route the second fluid to a high pressure control piston for manipulating the high pressure control piston between a high pressure closed position and a high pressure open position. The feedback circuit also includes a second branch configured to route the second fluid to a low pressure control piston moveably disposed within the high pressure control piston for manipulating the low pressure control piston between a low pressure closed position and a low pressure open position.

10 Claims, 6 Drawing Sheets

AIRCRAFT BLEED SYSTEM AND METHOD OF CONTROLLING AN AIRCRAFT BLEED SYSTEM

BACKGROUND OF THE INVENTION

The present invention relates to aircrafts, and more particularly to an aircraft bleed system, as well as a method of controlling the aircraft bleed system.

Aircraft bleed systems typically supply air to environmental control systems, which may then distribute the air to numerous systems and components for a variety of applications. The supply of the air is often provided via multiple ports, such as a low pressure port and a high pressure port, with one port being employed at a time. For example, the low pressure port may be used when the pressure is high enough to satisfy system requirements, while the high pressure port is used when the pressure of the air supplied via the low pressure port is insufficient to meet system requirements. Switching between ports requires multiple valves, such as a high pressure valve, a pressure regulating valve and a check valve in the low pressure port to prevent high pressure air from being back-fed into a low pressure stage, which may result in stalling of an engine. The switching between the multiple valves currently employed leads to inefficiencies and may result in undesirable system operations, such as the feeding of high pressure into the low pressure stage example described above.

BRIEF DESCRIPTION OF THE INVENTION

According to one embodiment, an aircraft bleed system includes a low pressure supply port for delivering a first fluid at a first pressure. Also included is a high pressure supply port for delivering a second fluid at a second pressure, the second pressure greater than the first pressure. Further included is a feedback circuit in operable communication with the high pressure supply port for receiving the second fluid. The feedback circuit includes a first branch configured to route the second fluid to a high pressure control piston for manipulating the high pressure control piston between a high pressure closed position and a high pressure open position. The feedback circuit also includes a second branch configured to route the second fluid to a low pressure control piston moveably disposed within the high pressure control piston for manipulating the low pressure control piston between a low pressure closed position and a low pressure open position.

According to another embodiment, a method of controlling an aircraft bleed system is provided. The method includes supplying a fluid through a high pressure supply port to a feedback circuit. Also included is routing the fluid through a first branch of the feedback circuit to a high pressure control piston to manipulate the high pressure control piston between a high pressure closed position and a high pressure open position. Further included is routing the fluid through a second branch of the feedback circuit to a low pressure control piston moveably disposed within the high pressure control piston to manipulate the low pressure control piston between a low pressure closed position and a low pressure open position.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
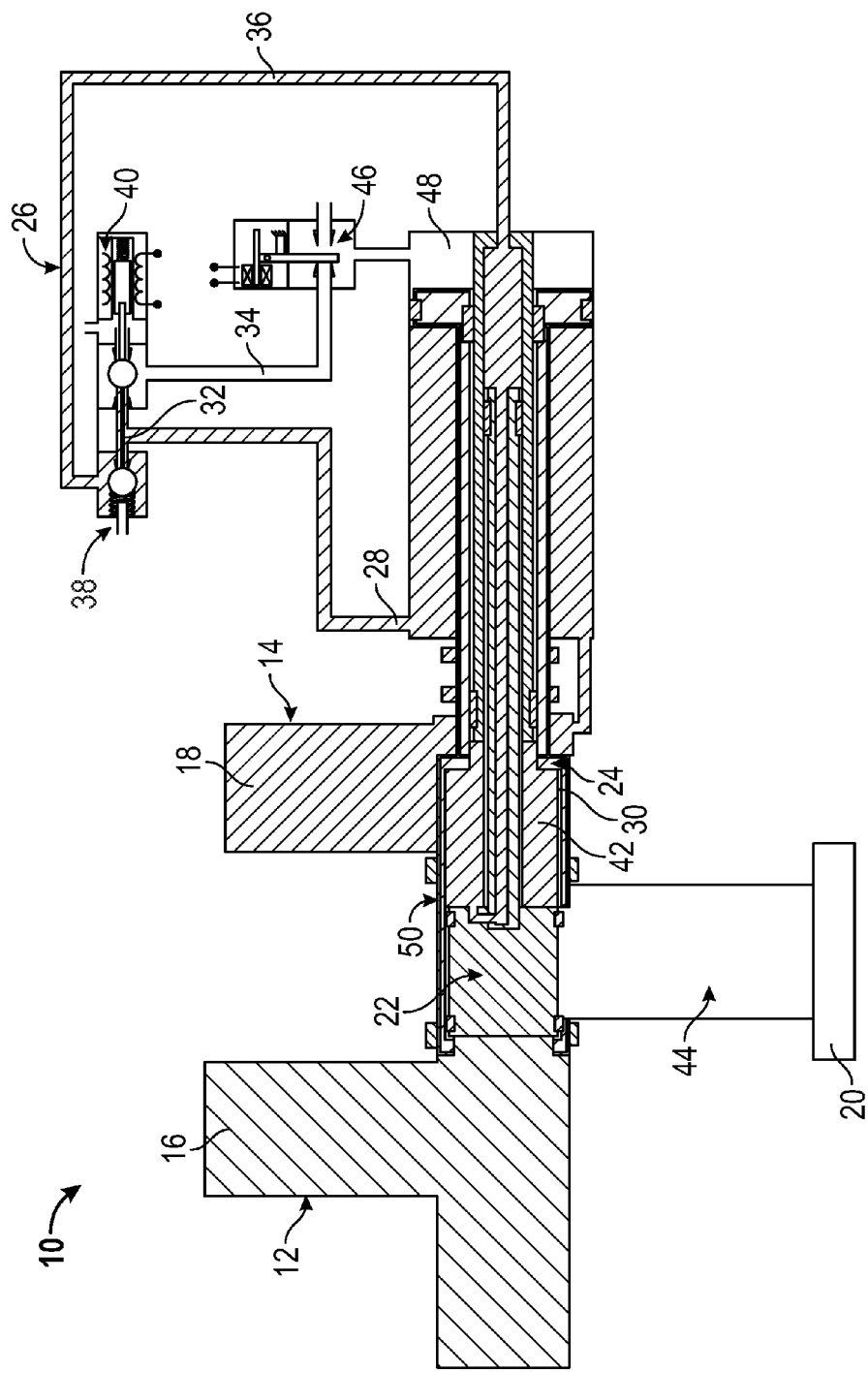
FIG. 1 is a partial schematic illustration of an aircraft bleed system having a regulating arrangement in a fully closed position.

Referring to FIG. 1, a portion of an aircraft bleed system 10 is schematically illustrated. Specifically, a low pressure supply port 12 and a high pressure supply port 14 are in fluid communication with a fluid source configured to supply a fluid, such as air. In one embodiment, the low pressure supply port 12 and the high pressure supply port 14 are fluidly coupled to a gas turbine engine (not illustrated). One or more portions of the gas turbine engine, such as one or more compressors, may supply the fluid as a low pressure fluid 16 to the low pressure supply port 12 and as a high pressure fluid 18 to the high pressure supply port 14. The respective pressure ranges of the low pressure fluid 16 and the high pressure fluid 18 will vary based on the application of use, but irrespective of the precise application, it is to be understood that the high pressure fluid 18 is at a pressure greater than the pressure of the low pressure fluid 16. Both the low pressure supply port 12 and the high pressure supply port 14 are configured to route the fluid (i.e., air) to a system requiring pressurized air, such as an environmental control system 20 that processes the supplied air for a variety of aircraft applications.

The ability of the low pressure fluid 16 and the high pressure fluid 18 to freely be supplied to the environmental control system 20 is determined by positioning of a low pressure control piston 22 and a high pressure control piston 24, which are both controlled by a feedback circuit 26 that is in fluid communication with the high pressure supply port 14 to receive the high pressure fluid 18 proximate a main inlet 28. The low pressure control piston 22 is disposed at least partially within a portion of the high pressure control piston 24, such as along an inner wall 30 of the high pressure control piston 24. The low pressure control piston 22 is independently moveable within the high pressure control piston 24 in a sliding manner between a low pressure open position and a low pressure closed position. Similarly, the high pressure control piston 24 is moveable in a sliding manner between a high pressure open position and a high pressure closed position. In one embodiment, the low pressure control piston 22 and the high pressure control piston 24 work in conjunction to form a spool valve. The positions referenced above, as well as intermediate positions, will be described in detail below.

The high pressure fluid 18 is supplied to the high pressure supply port 14 continuously and is routed to the feedback circuit 26. The feedback circuit 26 comprises one or more conduits for routing the high pressure fluid 18. Specifically, the high pressure fluid 18 is routed from the main inlet 28 to a junction 32 defining a splitting location for the high pressure fluid 18. The high pressure fluid 18 is routed to a first branch 34 and a second branch 36 of the feedback circuit 26, depending on the condition of a first valve arrangement 38 disposed proximate the junction 32. An actuator 40 for controlling the first valve arrangement 38 is in operable communication with the first valve arrangement 38 and in one embodiment the actuator 40 comprises a solenoid configured to switch between an energized condition and a de-energized condition. In a de-energized condition of the solenoid, the first valve arrangement 38 is configured to route substantially all of the high pressure fluid 18 to and through the second branch 36. In another embodiment, the actuator 40 comprises a torque motor. The high pressure fluid 18 routed through the second branch 36 is distributed into a cavity 42 within the high pressure control piston 24 into close proximity with the low pressure control piston 22, thereby exerting a pressure on the low pressure control piston 22. In the exemplary embodiment, the high pressure fluid 18 is routed to the cavity 42 through an interior line within both the low pressure control piston 22 and the high pressure control piston 24.

As illustrated, both the low pressure control piston 22 and the high pressure control piston 24 are disposed in a fully closed position. Specifically, the low pressure control piston 22 is in the low pressure closed position and the high pressure control piston 24 is in the high pressure closed position, such that neither the low pressure fluid 16 nor the high pressure fluid 18 may be routed to the environmental control system 20. As shown, routing of the high pressure fluid 18 to the cavity 42 results in biasing of the low pressure control piston 22 to the low pressure closed position.

Figure 2:
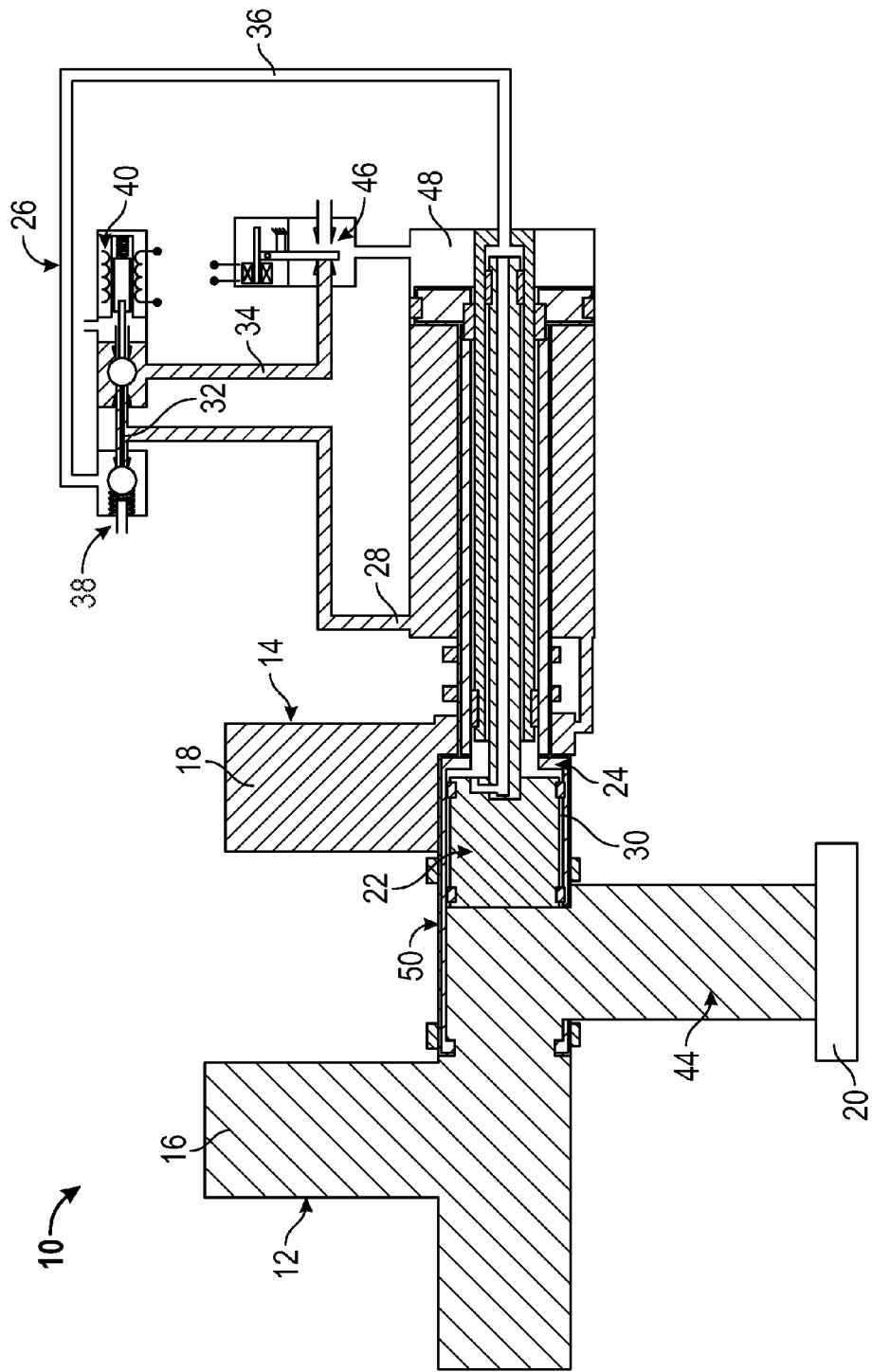
FIG. 2 is a schematic illustration of the regulating arrangement in a low pressure open position.

Referring now to FIG. 2, the low pressure control piston 22 is shown in the low pressure open position, while the high pressure control piston 24 remains in the high pressure closed position. To achieve the low pressure open position, the high pressure fluid 18 is cutoff to the second branch 36 by energizing the actuator 40 to close the path to the second branch 36, while opening a path to the first branch 34 for the high pressure fluid 18 to be routed to. Upon closing the path to the second branch 36, the high pressure fluid 18 is no longer routed to the cavity 42, thereby removing the pressure exerted on the low pressure control piston 22 and allowing the low pressure control piston 22 to slide relative to the high pressure control piston 24. Movement to the low pressure open position removes the blockage between the low pressure supply port 12 and an outlet 44 to the environmental control system 20.

The first branch 34 includes a second valve arrangement 46, such as a three way valve arrangement controlled by a torque motor and/or solenoid, configured to block flow of the high pressure fluid 18 in a de-energized state and to allow flow of the high pressure fluid 18 in an energized state. The illustrated condition is a de-energized state blocking flow of the high pressure fluid 18 to downstream locations, such as a volume 48 in proximity to the high pressure control piston 24. As described below, control of the second valve arrangement 46 modulates positioning of the high pressure control piston 24 and may be achieved by integration with an electronic controller or the like.

Figure 3:
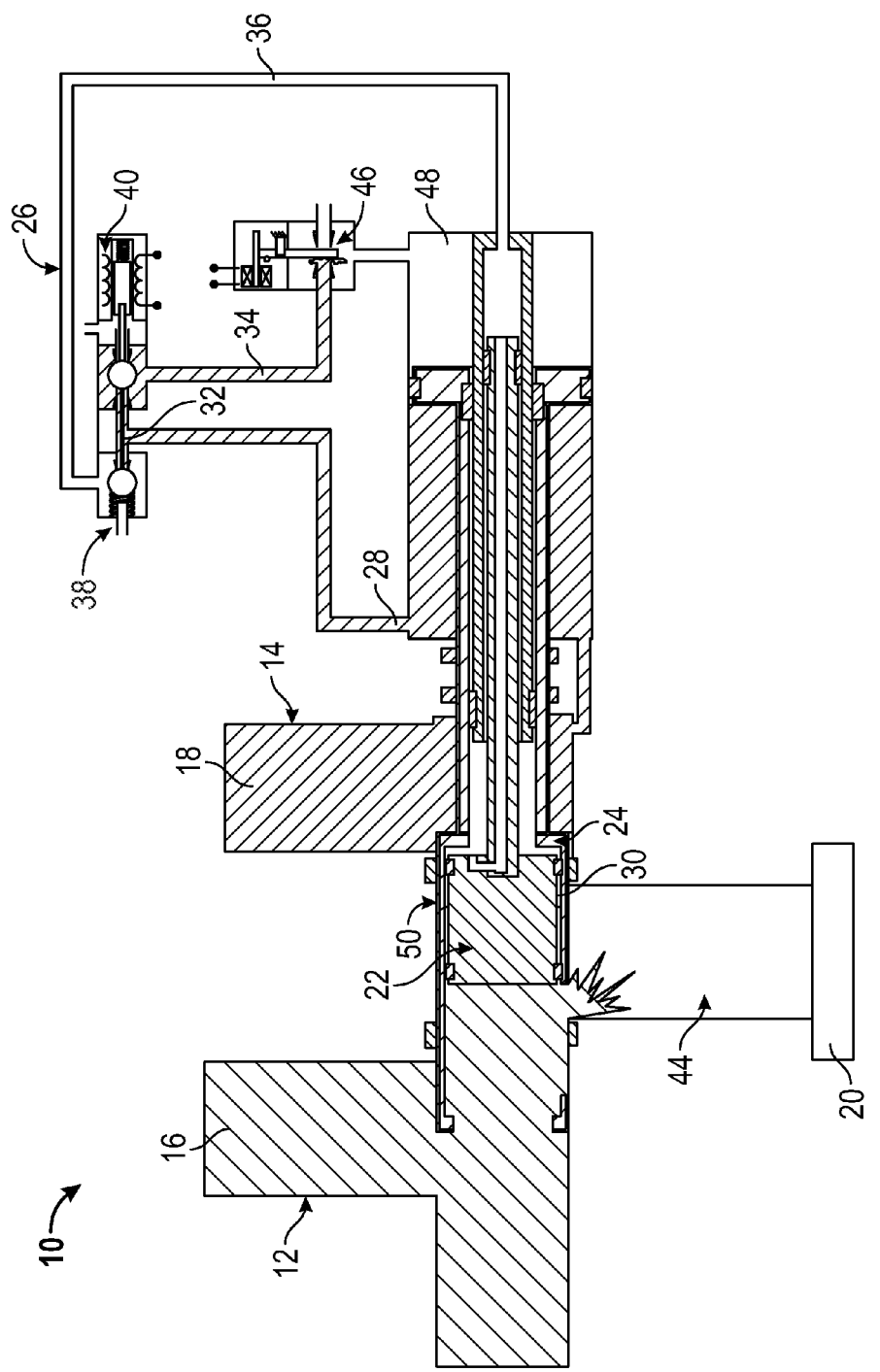
FIG. 3 is a schematic illustration of the regulating arrangement in a low pressure regulating position.

Referring now to FIG. 3, the low pressure control piston 22 is in the low pressure open position and the high pressure control piston 24 continues to block the high pressure fluid 18 from being routed to the outlet 44 leading to the environmental control system 20. The low pressure control piston 22 and the high pressure control piston 24 may be collectively referred to as a regulating arrangement 50 and it can be seen that although the low pressure fluid 16 is flowing to the outlet 44, the volumetric flow rate has decreased as a result of movement of the regulating arrangement 50, and more specifically movement of the high pressure control piston 24 away from the high pressure closed position toward the high pressure open position. The movement of the high pressure control piston 24 occurs upon an introduction of the high pressure fluid 18 into the volume 48 from the first branch 34. This is achieved by energizing the second valve arrangement 46, and more specifically the torque motor and/or solenoid, such that the blockage within the first branch 34 is reduced or eliminated. The torque motor may be configured to control and meter the flow rate of the high pressure fluid 18 to the volume 48, which thereby regulates the movement of the high pressure control piston 24. The high pressure control piston 24 is controlled by modulating the torque motor. Specifically, the torque motor is modulated to control servo pressure to position the high pressure control piston 24. Partial or full energizing of the torque motor is facilitated by an electronic controller (not illustrated) that may work in conjunction with pressure and/or temperature sensors located at one or more positions, including proximate the volume 48 and the outlet 44. It can be appreciated that a plurality of low pressure fluid regulating positions are present between the high pressure closed position and the high pressure open position, with one of the plurality of low pressure fluid regulating positions illustrated.

Figure 4:
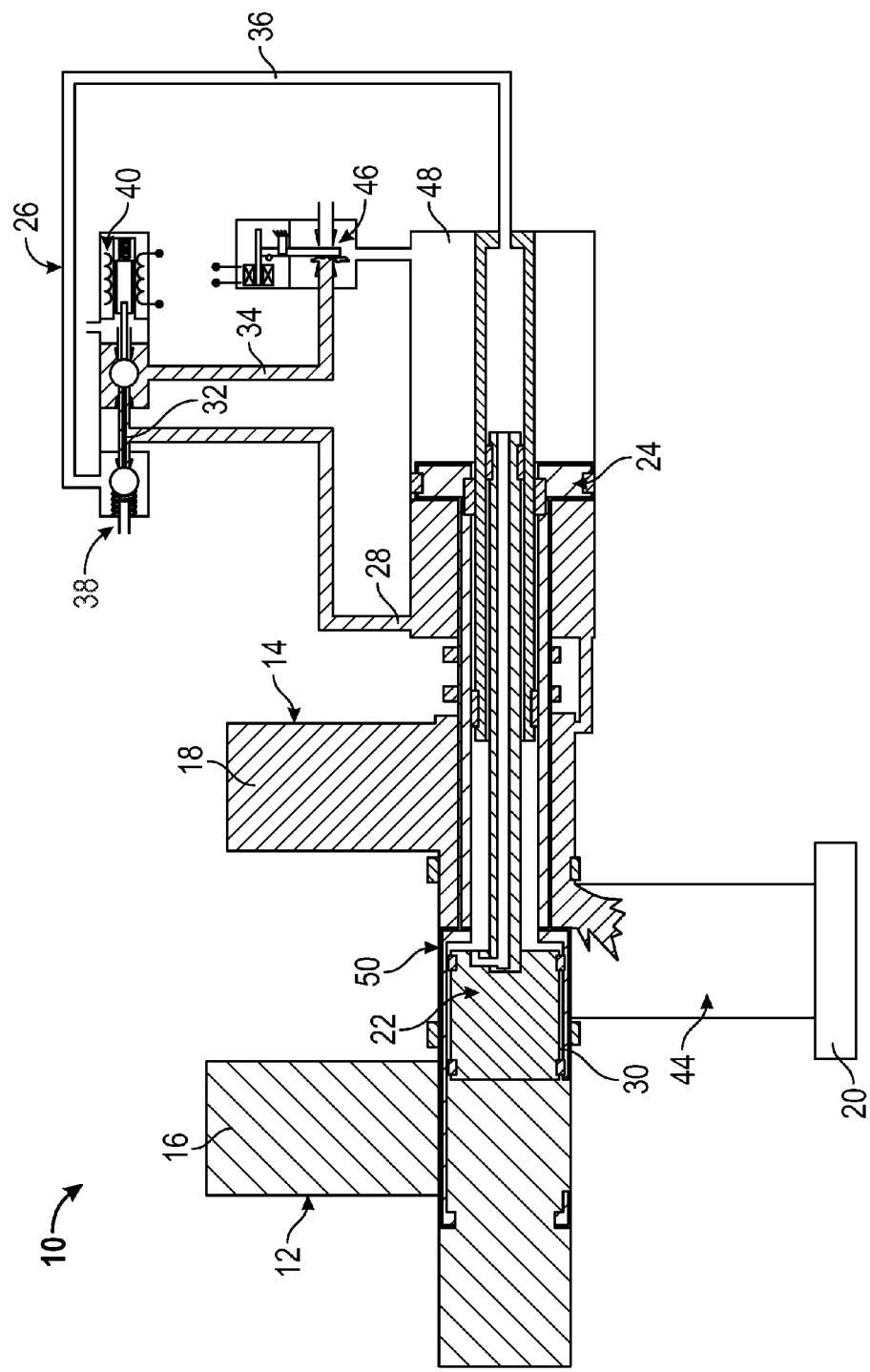
FIG. 4 is a schematic illustration of the regulating arrangement in a high pressure regulating position.

Referring now to FIG. 4, the second branch 36 is blocked by the first valve arrangement 38, while the second valve arrangement 46 continues to permit flow of the high pressure fluid 18 through the first branch 34 to the volume 48, thereby further moving the regulating arrangement 50, and more specifically the high pressure control piston 24. As the high pressure control piston 24 moves further toward the high pressure open position, it can be seen that the low pressure fluid 16 is blocked from passage to the outlet 44, while the high pressure fluid 18 flows from the high pressure supply port 14 to the outlet 44. It can be appreciated that a plurality of high pressure fluid regulating positions are present between the high pressure closed position and the high pressure open position, with one of the plurality of high pressure fluid regulating positions illustrated. As shown, the high pressure control piston 24 is not fully open, such that a restricted volumetric flow rate of the high pressure fluid 18 is permitted to pass to the outlet 44.

Figure 5:
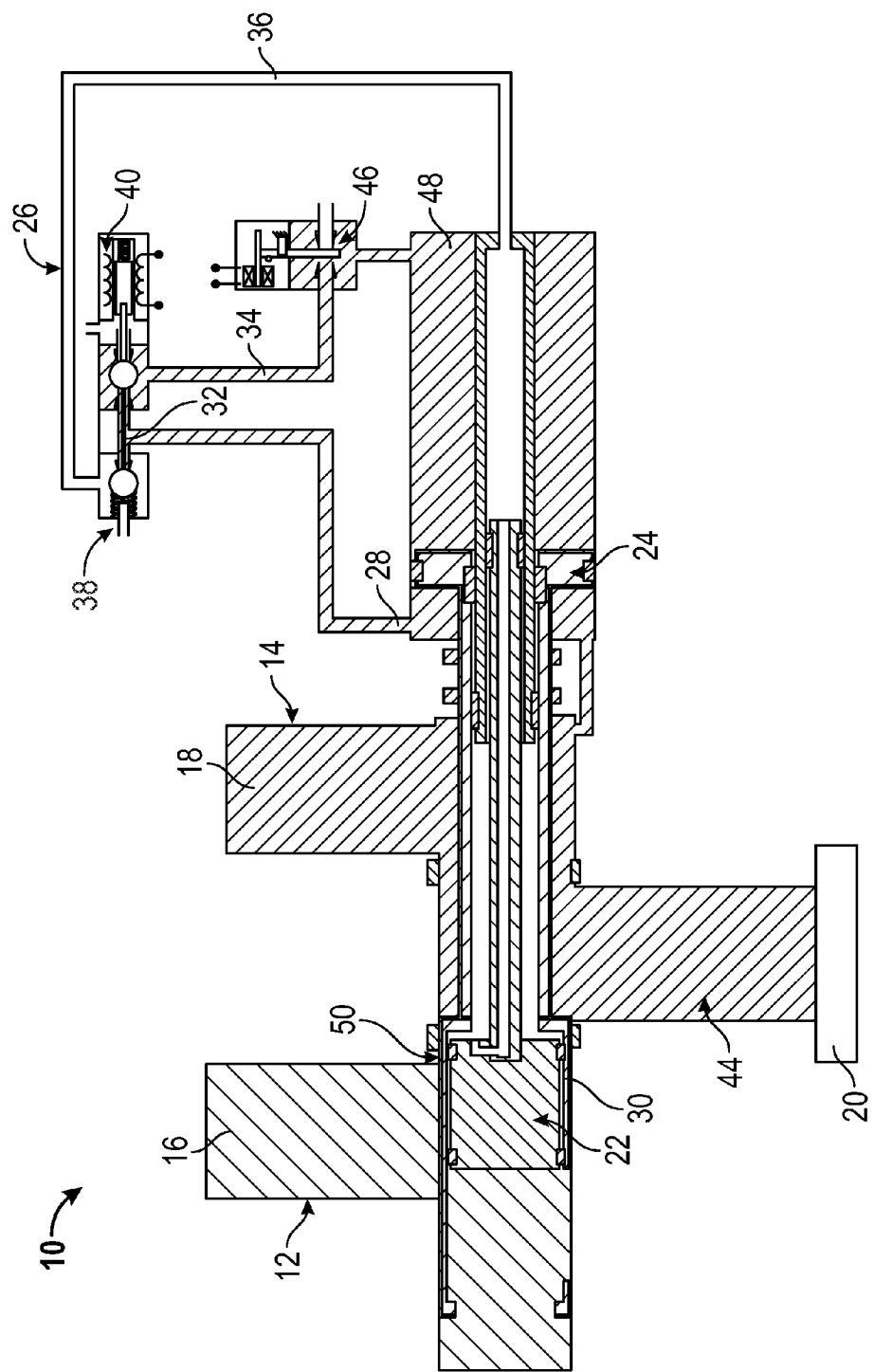
FIG. 5 is a schematic illustration of the regulating arrangement in a high pressure open position.

Referring now to FIG. 5, the high pressure control piston 24 is in the high pressure open position, thereby fully opening the path between the high pressure supply port 14 and the outlet 44.

Advantageously, the regulating arrangement 50 allows the aircraft bleed system 10 to supply the low pressure fluid 16 or the high pressure fluid 18 at desired flow rates, as restricted flow rates may be advantageous at various operating conditions. Additionally, a single regulating arrangement is employed to provide clean switches between the supply of the low pressure fluid 16 and the high pressure fluid 18, reducing the likelihood of a feeding back of the high pressure fluid 18 to the low pressure supply port 12.

Figure 6:
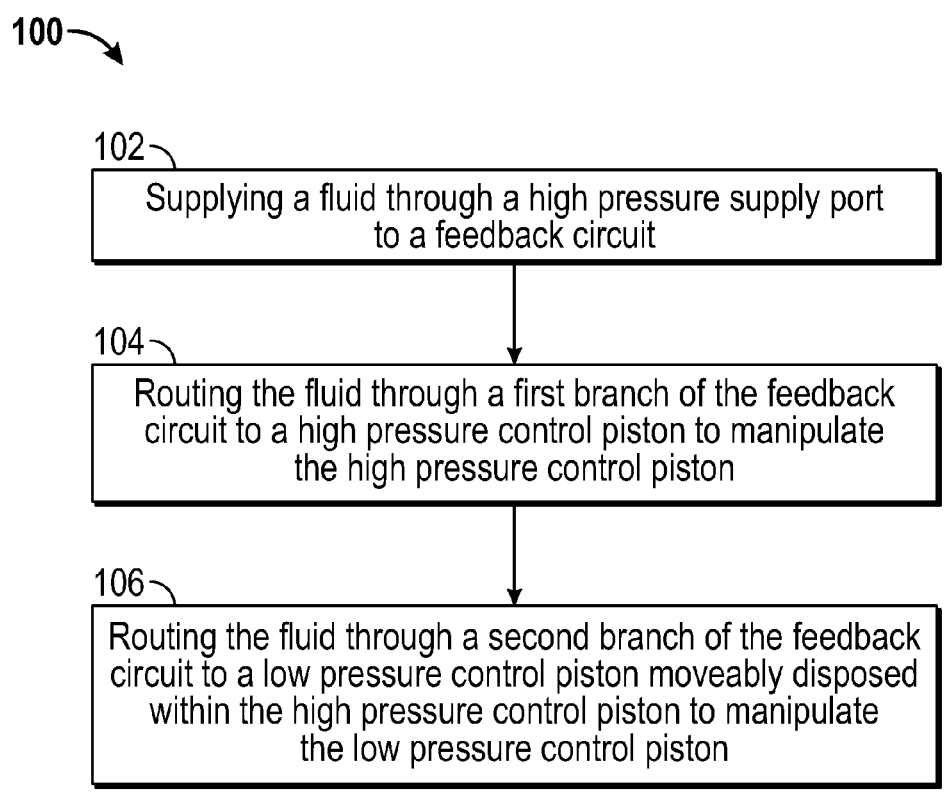
FIG. 6 is a flow diagram illustrating a method of controlling an aircraft bleed system.

A method of controlling an aircraft bleed system 100 is also provided as illustrated in FIG. 6 and with reference to FIGS. 1-5. The aircraft bleed system 10, as well as the regulating arrangement 50 and the feedback circuit 26, have been previously described and specific structural components need not be described in further detail. The method for controlling an aircraft bleed system 100 includes supplying a fluid through a high pressure supply port to a feedback circuit 102. The fluid is routed through a first branch of the feedback circuit to a high pressure control piston to manipulate the high pressure control piston 104. The fluid is also routed through a second branch of the feedback circuit to a low pressure control piston to manipulate the low pressure control piston 106.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft bleed system comprising:
    a low pressure supply port for delivering a first fluid at a first pressure;
    a high pressure supply port for delivering a second fluid at a second pressure, the second pressure greater than the first pressure; and
    a feedback circuit in operable communication with the high pressure supply port for receiving the second fluid, the feedback circuit comprising:
        a first branch configured to route the second fluid to a high pressure control piston for manipulating the high pressure control piston between a high pressure closed position and a high pressure open position; and
        a second branch configured to route the second fluid to a low pressure control piston moveably disposed within the high pressure control piston for manipulating the low pressure control piston between a low pressure closed position and a low pressure open position.

2. The aircraft bleed system of claim 1, the first branch comprising at least one of a solenoid and a torque motor for controlling the high pressure control piston.

3. The aircraft bleed system of claim 1, further comprising a plurality of first fluid regulating positions disposed between the high pressure closed position and the high pressure open position.

4. The aircraft bleed system of claim 1, further comprising a plurality of second fluid regulating positions disposed between the high pressure closed position and the high pressure open position.

5. The aircraft bleed system of claim 1, further comprising an outlet for the first fluid and the second fluid, the outlet configured to route the first fluid and the second fluid to an environmental control system.

6. The aircraft bleed system of claim 1, wherein the high pressure control piston and the low pressure control piston comprise a regulating arrangement.

7. The aircraft bleed system of claim 6, wherein the regulating arrangement comprises a spool valve.

8. The aircraft bleed system of claim 1, further comprising a junction for splitting the second fluid to the first branch and the second branch.

9. The aircraft bleed system of claim 8, the feedback circuit further comprising an actuator for controlling a valve configured to regulate routing of the second fluid to the first branch and the second branch.

10. The aircraft bleed system of claim 9, wherein the actuator comprises at least one of a solenoid and a torque motor.

\* \* \* \* \*